3,338,963
TETRACYCLINE COMPOUNDS
Joseph Petisi, Nanuet, N.Y., and James Howard Boothe, Montvale, N.J., assignors to American Cyanamid Company, New York, N.Y., a corporation of Maine
No Drawing. Filed Oct. 28, 1960, Ser. No. 65,584
12 Claims. (Cl. 260—559)

This application is a continuation-in-part of application Ser. No. 797,884, filed Mar. 9, 1959, now abandoned, which application, in turn, is a continuation-in-part of application Ser. No. 767,095, filed Oct. 14, 1958, now abandoned, which application, in turn, is a continuation-in-part of application Ser. No. 730,799, filed Apr. 25, 1958, now abandoned.

This invention relates to new compounds of the tetracycline family and more particularly is concerned with novel tetracyclines which may be represented by the following general formula:

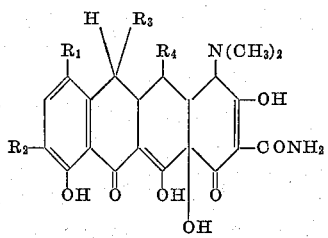

wherein $R_1$ and $R_2$ are hydrogen, nitro, amino, formylamino, acetylamino, p-dihydroxyborylbenzoylamino, p-aminobenzenesulfonylamino, chlorine, bromine or diazonium with the proviso that $R_1$ and $R_2$ may not both be hydrogen and with the further proviso that when $R_1$ is chlorine or bromine $R_2$ may not be hydrogen and vice versa, $R_3$ is hydrogen or methyl and $R_4$ is hydrogen or hydroxy.

Certain of the new compounds of this invention e.g., the nitrotetracyclines, are prepared by the reaction of 6-demethyl-6-deoxytetracycline, 6-deoxytetracycline or 5-hydroxy-6-deoxytetracycline with potassium nitrate, and a strong mineral acid, e.g., sulfuric acid, at a temperature ranging from about −15° C. to about +15° C. The resulting nitrotetracycline is usually isolated from the reaction mixture as the acid sulfate by precipitation with cold ether. The free base may be obtained by adjusting an aqueous solution of the product to a pH of from about 4 to 6 with mild alkali, i.e., sodium carbonate.

When two equivalents of potassium nitrate are used with 6-deoxytetracycline (see Example 10 hereinafter) it enables the facile isolation of 9-nitro-6-deoxytetracycline. When one equivalent of potassium nitrate is used with 6-deoxytetracycline (see Example 8 hereinafter) a mixture of 7-nitro-6-demethyltetracycline and 9-nitro-6-deoxytetracycline is produced. The 7-nitro isomer is separated from the mixture by chromatography.

When 6-demethyl-6-deoxytetracycline is used as the starting material it has been found that the resulting nitration product is a mixture which can be separated into two distinct compounds by fractional crystallization. These are referred to as 9-nitro-6-demethyl-6-deoxytetracycline and 7-nitro-6-demethyl-6-deoxytetracycline.

The isolation of 7-nitro-6-demethyl-6-deoxytetracycline from the crude nitration product is accomplished by fractional crystallization. A gross separation of inorganic and organic compounds is performed on the crude ether precipitated nitration product using ethanol as the solvent. The organic product is then separated into two components utilizing the solubility differences in methanol of the respective free bases. 7-nitro-6-demethyl-6-deoxytetracycline is isolated as a crystalline sulfate salt from the methanol solution and is purified by forming the free base, and then recrystallizing the free base in a standard manner. The two compounds differ from each other both by spectral data and biological activity. The main difference in the ultraviolet spectra between 9-nitro-6-demethyl-6-deoxytetracycline and 7-nitro-6-demethyl - 6 - deoxytetracycline lies mainly in the long wavelength region. In 0.1 N HCl the absorption maxima of 7-nitro-6-demethyl-6-deoxytetracycline is at 350 m$\mu$ whereas 9-nitro-6-demethyl-6-deoxytetracycline absorbs at 360 m$\mu$. In 0.1 M $Na_2B_4O_7$, 7-nitro-6-demethyl - 6 - deoxytetracycline has a well-defined absorption maxima at 370 m$\mu$ while 9-nitro-6-demethyl-6-deoxytetracycline has a very broad absorption maxima peaking slightly at 350 m$\mu$.

The infrared absorption spectra of 7-nitro-6-demethyl-6-deoxytetracycline shows nitro absorption bands at 6.54$\mu$ and 7.46$\mu$, substantially the same as the nitro absorption bands of 9-nitro-6-demethyl - 6 - deoxytetracycline. However, the complete infrared curve of 7-nitro-6-demethyl-6-deoxytetracycline is otherwise different from the infrared curve of 9-nitro-6-demethyl-6-deoxytetracycline.

As will be apparent from the examples which follow, the nitration of 6-deoxytetracycline and 6-demethyl-6-deoxytetracycline results in two mononitro isomers with the nitro group attached to the aromatic ring of the tetracycline nucleus in the ortho position to the hydroxyl in one compound and in the para position to the hydroxyl in the other compound, or in other words, in one isomer the nitro group is in the 7-position of the aromatic ring and in the other isomer it is in the 9-position.

The nitrotetracyclines may be reduced either chemically or catalytically to form the corresponding aminotetracyclines. The catalytic reduction may be carried out in a polar solvent such as water, a lower alkanol, e.g., methanol, ethanol, etc., a lower alkoxy lower alkanol, e.g., 2-methoxyethanol, 2-ethoxyethanol, etc., or a lower alkanoic acid, e.g., acetic acid, propionic acid, etc., in a mineral acid solution, e.g., hydrochloric acid, sulfuric acid or the like, and in the presence of a noble metal catalyst such as finely-divided paladium, rhodium or other metal of the platinum family. The pure metal may be used or the metal may be used in the form of an oxide or hydroxide and preferably the catalyst is suspended on one of the common carriers such as finely-divided alumina, activated charcoal, diatomaceous earth, etc. The reduction may be carried out at temperatures ranging from about 10° C. to about 40° C., and preferably at room temperature, that is around 25° C. and at hydrogen pressures of about one to about three atmospheres.

The aminotetracycline so-prepared may be recovered from the reaction mixture by any desired means, as by removal of the catalyst and concentration of the solution. The product is evaporated to dryness and purified aminotetracycline is obtained by precipitation from ethanol-ethyl acetate. The product may be further purified, if desired, by recrystallization in alcohol in a standard manner.

The nitrotetracyclines may also be reduced to amino-tetracyclines by a chemical reduction process in which the nitrotetracycline is contacted with a hydrogen-producing mixture such as metallic zinc in a mildly acidic medium such as hydrochloric acid, acetic acid, etc., at a temperature of from about 10° C. to about 40° C. and for a time of from about 15 minutes to about two hours. The concentration of the nitrotetracycline in the acidic medium depends upon its solubility. The zinc used for the reaction should preferably be in finely-divided form, for instance, zinc dust and this material should be used to an extent of about 0.35 part by weight of the metal per part by weight of the nitrotetracycline. Proportions of metal higher than about 5 parts by weight are generally not necessary. The reduced solution contains the desired aminotetracycline which may be recovered therefrom in a standard manner.

The aminotetracyclines so-formed may then be converted to the haloaminodeoxytetracyclines by treatment with a halogenating agent such as an N-haloamide, i.e., N-bromosuccinimide, N-bromoacetamide, N-bromophthalimide, N-chlorosuccinimide, N-iodosuccinimide, etc., in the presence of a concentrated mineral acid, e.g., hydrochloric acid, sulfuric acid, etc. This reaction is preferably carried out at temperatures of from about 0° C. to about 20° C. until the reaction is complete. The resulting product is a di-substituted 6-deoxytetracycline or 6-demethyl-6-deoxytetracycline depending upon the starting material used. For instance, 9-amino-7-bromo-6-deoxytetracycline may be prepared by reacting 9-amino-6-deoxytetracycline with N-bromosuccinimide under the conditions specified.

The aminotetracyclines may also be nitrated, under the conditions specified above for forming the mono-substituted nitrotetracycline, to produce 9-amino-7-nitro-6-deoxytetracycline. The nitrotetracyclines may also be brominated using N-bromosuccinimide, for example, to form a di-substituted deoxytetracycline.

The new tetracyclines of this invention are amphoteric compounds and hence acid addition salts, that is both mono- and di-salts (when an aminotetracycline is used) may be readily prepared. In general, the preferred acids are the non-toxic pharmaceutically acceptable acids, e.g., the mineral acids such as hydrochloric acid, sulfuric acid and the like although organic acids such as trichloroacetic acid may also be used. The acid addition salts of the new tetracyclines may be prepared by treating the amphoteric compound with approximately two equivalents or more of the chosen acid. Preferably the tetracycline is suspended in a suitable solvent during the acidification.

The aminotetracyclines formed by either the catalytic reduction or chemical reduction methods described above may be diazotized by reaction with nitrous acid to form the diazonium salt. The diazonium group may then be replaced using classical procedures by hydrogen, hydroxy, alkoxy, halogen (Sandmeyer reaction), cyano, etc. If desired, the diazonium salt may be coupled with phenols and tertiary amines in weakly acid, neutral or alkaline solution to produce highly colored azo compounds.

The new tetracyclines of this invention are biologically active and have the broad-spectrum antibacterial activity of the previously known tetracyclines. The antibacterial spectrum of certain of these compounds representing the amount required to inhibit the growth of various typical bacteria, was determined in a standard manner by the agar dilution streak plate technique which is commonly used in testing new antibiotics. The minimal inhibitory concentrations, expressed in gammas per milliliter, against various test organisms are reported in the table below. For comparison purposes, the antibacterial activity of tetracycline against the same organisms is also included.

| Organism | Tetracycline | 7-nitro-6-demethyl-6-deoxy-tetracycline | 9-amino-6-demethyl-6-deoxy-tetracycline | 7-amino-6-demethyl-6-deoxy-tetracycline |
|---|---|---|---|---|
| Mycobacterium ranae | 1 | 0.25 | 0.5 | 0.5 |
| Mycobacterium smegmatis ATCC 607 | 1 | 0.5 | 0.5 | 1 |
| Staphylococcus aureus 209P | 2 | 0.5 | 1 | 2 |
| Sarcina Lutea 1001 | 2 | 0.5 | 1 | 1 |
| Bacillus subtilis ATCC 6633 | 0.5 | 0.25 | 0.25 | 0.25 |
| Streptococcus pyogenes C203 | 0.5 | 0.25 | 0.5 | 0.5 |
| Streptococcus α No. 11 | 250 | 31 | 31 | 125 |
| Streptococcus β No. 80 | 250 | 31 | 31 | 62 |
| Staphylococcus aureus NY 104 | 4 | 0.5 | 2 | 1 |
| Bacillus cereus No. 5 | 0.25 | 0.125 | 0.5 | 0.25 |
| Pseudomonas aeruginosa | 8 | 4 | 8 | 8 |
| Proteus vulgaris 8427 | 31 | 1 | 8 | 8 |
| Escherichia coli ATCC 9637 | 8 | 4 | 15 | 8 |
| Salmonella gallinarum | 8 | 4 | 8 | 8 |
| Escherichia coli No. 22 | 4 | 2 | 4 | 1 |

The new tetracycline compounds of this invention are considerably more stable toward acid and alkali than is the parent compound tetracycline. In addition, the aminotetracyclines are much more soluble than the parent compound.

The invention will be described in greater detail in conjunction with the following specific examples.

EXAMPLE 1

*Preparation of crude nitration product of 6-demethyl-6-deoxytetracycline*

To a solution of 900 milligrams (2 mmoles) of 6-demethyl-6-deoxytetracycline hydrochloride [J.A.C.S., 80, 5324 (1958)] prepared by contacting a polar solvent solution of 6-demethyltetracycline [J.A.C.S., 79, 4561 (1957)] with hydrogen in the presence of boric acid and a noble metal catalyst until approximately one mole of hydrogen had been absorbed for each mole of 6-demethyltetracycline in 50 milliliters of concentrated $H_2SO_4$ at 0° C., there was added 200 milligrams (2 mmoles) of $KNO_3$. The light brown reaction solution was stirred at 0° C. for 20 minutes. This cold solution was gradually poured into one liter of diethyl ether at 5° C. The addition was accomplished at a rate which maintained the temperature of the ether between 5° and 10° C. The light yellow solid, which had precipitated immediately, settled gradually in the ether solution. Most of the ether solution was decanted and the solid was filtered, washed with cold ether (4×10 ml.), and dried in vacuo at room temperature for four hours. Weight of solid: 1.01 gram.

200 milligrams of the above nitration product was dissolved in 5 milliliters of $H_2O$ with stirring. This light brown solution (pH 1.3) was adjusted to pH 5.0 with 2 N $Na_2CH_3$. A brownish yellow solid precipitated. This mixture was allowed to stir in an ice bath for one hour. The solid (as the free base) was filtered, washed with $H_2O$ (3×5 ml.) and dried in vacuo at 60° C. for four hours. Weight 80 milligrams. Melting point, chars 197° C.

*Analysis.*—Calculated for $C_{21}H_{21}N_3O_9 \cdot H_2O$ (494.4): C, 50.9; H, 5.08; N, 8.46; $H_2O$, 7.26. Found: C, 50.63; H, 4.84; N, 8.79; $H_2O$ (loss on drying), 5.29.

The ultraviolet spectrum of this product has changed in character from that of the starting material 6-demethyl-6-deoxytetracycline. In N/10 hydrochloric acid there is a 5 m$\mu$ decrease in the short wavelength absorption to 262 m$\mu$ while in the long wavelength absorption there is a 10 m$\mu$ increase to 355 m$\mu$. The infrared spectrum, which is also different from that of 6-demethyl-6-deoxytetracycline, has nitro group absorption bands at 6.56$\mu$ and 7.45$\mu$.

EXAMPLE 2

*Separation of crude nitration products into 9-nitro-6-demethyl-6-deoxytetracycline and 7-nitro-6-demethyl-6-deoxytetracycline*

A slurry of 11.78 grams of the ether precipitated nitration product of 6-demethyl-6-deoxytetracycline in 500 milliliters of absolute ethanol was heated to boiling on a steam bath. The insoluble material was filtered immediately, washed with hot absolute ethanol (2×25 ml.), and then with ether (3×50 ml.). The solid was air dried at room temperature. Weight 3.70 grams. The cloudy ethanol filtrate and the ethanol washes were combined and evaporated under vacuum to dryness at 30° C. Weight 8.1 grams.

The solid residue from the ethanol evaporation was slurried in 300 milliliters of methanol (pH in $H_2O$ 2.5) and then triethylamine was added until a pH 5.0 (in $H_2O$) was achieved. An insoluble dark yellow crystalline solid was filtered, washed with methanol (2×5 ml.) and dried under vacuum at 60° C. for one hour to give 2.78 grams of 9-nitro-6-demethyl-6-deoxytetracycline. The methanol filtrate and washes were combined and adjsted to pH 1.8 with 6 N $H_2SO_4$. After cooling the solution in an ice bath, a light yellow crystalline solid (needle-like clusters) began to precipitate. The mixture was stirred in an ice bath for two hours and then the solid was filtered, washed with ether (5×10 ml.) and dried under vacuum at 60° C. for one hour to give 1.8 grams of 7-nitro-6-demethyl-6-deoxytetracycline.

EXAMPLE 3

*Preparation of the free base of 7-nitro-6-demethyl-6-deoxytetracycline*

500 milligrams of the sulfate salt of 7-nitro-6-demethyl-6-deoxytetracycline was stirred in 20 milliliters of water. A small amount of insoluble solid was filtered through filter-aid on a sintered glass funnel. The clear yellow filtrate (pH 1.7) was adjusted to pH 5.2 with 2 N $Na_2CO_3$. A yellow, partially crystalline solid precipitated. The mixture was heated to ca. 80° C. on a steam cone and then cooled in an ice bath. The solid still seemed very fine and remained suspended in solution. The suspension was then frozen in a Dry Ice-methyl Cellosolve bath. After remaining frozen for one hour the mixture was allowed to warm to room temperature. The filtered solid was washed with water (2×5 ml.). The solid was placed under vacuum at room temperature overnight and then dried at 60° C. for one hour. Weight 284 milligrams.

EXAMPLE 4

*Recrystallization of the free base of 7-nitro-6-demethyl-6-deoxytetracycline*

70 milligrams of the free base (product of Example 3) was heated in 10 milliliters of water on a steam bath. A small amount of insoluble amorphous solid was filtered off hot. The filtrate which had become cloudy while filtering was reheated to a clear solution. On cooling slowly to room temperature a yellow crystalline solid (needle-like clusters) precipitated. The solid was filtered, washed with 1 milliliter of water and dried under vacuum at 60° C. for one hour. Weight 37.2 milligrams.

A portion of this free base was heated in reagent toluene in a Soxhlet extraction apparatus. The thimble contained calcium hydride and the yellow toluene solution was refluxed for 4 hours. This procedure was used in order to remove all water of crystallization of the compound.

A yellow solid was obtained which was heated at 140° C. for 2 hours under vacuum and then immediately analyzed.

*Analysis.*—Calculated for $C_{21}H_{21}N_3O_9$–0.2 mole toluene. C, 56.2; H, 4.70; N, 8.84; O, 30.3. Found: C, 55.94; H, 5.47; N, 8.68; O (direct), 29.73.

In 0.1 N HCl the ultraviolet absorption maxima is at 350 m$\mu$. In 0.1 M $Na_2B_4O_7$ the ultraviolet absorption maxima is at 370 m$\mu$. The infrared spectrum has nitro group absorption bands at 6.54$\mu$ and 7.46$\mu$.

EXAMPLE 5

*Preparation of the hydrochloride salt of 7-nitro-6-demethyl-6-deoxytetracycline*

To a slurry of 250 milligrams of the free base prepared in Example 4 in 25 milliliters of n-butanol, there was added 7 drops of concentrated HCl. A small amount of insoluble solid was filtered and to the clear yellow filtrate there was added an additional 7 drops of concentrated HCl. The solution which was cooled in an ice bath became slightly cloudy, but did not precipitate any solid. On warming it to 30° C., with scratching, a light yellow crystalline solid (needle-like clusters) began to precipitate. After the mixture remained in the cold (4° C.) overnight, the solid was filtered, washed with a few drops of n-butanol and dried under vacuum at 100° C. for 3 hours. Weight 223 milligrams.

EXAMPLE 6

*Preparation of 9-amino-6-demethyl-6-deoxytetracycline*

Fifty-one milligrams of 9 - nitro - 6 - demethyl - 6 - deoxytetracycline base prepared as in Example 2, was slurried in 5 milliliters of absolute ethanol. To this solution 3 drops of 6 N hydrochloric acid was added. The solid gradually dissolved. Five milligrams of platinum oxide was added to the clear yellow solution. The mixture was shaken vigorously under a hydrogen atmosphere for 10 minutes, at which time a slight excess of the theoretical volume of hydrogen had been taken up. The solution was filtered, and the catalyst was washed two times with 2 milliliter volumes of absolute ethanol. The filtrate and washings were combined, and the combined solution was concentrated to dryness under vacuum. The dark yellow solid residue was dried under vacuum at 60° C. for 1 hour. The yield of product was 40 milligrams.

$$\lambda_{max.}^{0.1\,N\,HCl}\ 215,\ 265,\ 348\ m\mu$$

$$\lambda_{max.}^{0.1\,N\,NaOH}\ 241,\ 270,\ 377\ m\mu$$

EXAMPLE 7

*Preparation of 7-amino-6-demethyl-6-deoxytetracycline*

The procedure of the preceding example was repeated except that 7 - nitro - 6 - demethyl - 6 - deoxytetracycline base, prepared as in Example 2, was used instead of the 9-isomer. The time required for hydrogenation was approximately one hour. The product was isolated as in Example 2 to give the biologically active 7 - amino - 6 - demethyl - 6 - deoxytetracycline.

$$\lambda_{max.}^{0.1\,N\,HCl}\ 218,\ 263,\ 350\ m\mu$$

$$\lambda_{max}^{0.1\,N\,NaOH}\ 241,\ 270,\ 385\ m\mu$$

EXAMPLE 8

*Preparation of nitro-6-deoxytetracycline*

The procedure of Example 1 was followed except that 932 milligrams (2 mmoles) of 6-deoxytetracycline hydrochloride [J.A.C.S., 80, 5324 (1958)] prepared by contacting a polar solvent solution of tetracycline with hydrogen in the presence of boric acid and a noble metal catalyst until approximately one mole of hydrogen had been absorbed for each mole of tetracycline was dissolved with stirring in 50 milliliters of concentrated sulfuric acid at 0° C. To the dark brown reaction solution there was gradually added with stirring 200 milligrams (2 mmoles) of potassium nitrate. After this addition the solution had lightened in color to a dark yellow. Stirring of the reaction solution at 0° C. was continued for approximately five minutes and then it was gradually poured into one liter of ether at 0° C., with stirring at a rate which maintained the temperature between 0° C. and 2° C. A light yellow solid which had precipitated was filtered, washed with ether (4×100 ml.) and dried under vacuum for two hours at room temperature. Weight 850 milligrams.

500 milligrams of the above nitration product was dissolved in 10 milliliters of water. To the dark brown solution there was added enough of a concentrated solution of sodium carbonate to achieve a pH of 5.0. A yellow birefringent solid which precipitated was filtered, washed with water (3×2 milliliters) and dried under vacuum at 60° C. for two hours. Weight 260 milligrams. Melting point, chars 190° C.

*Analysis.*—Calculated for $C_{22}H_{23}N_3O_9 \cdot 2H_2O$ (509.4): C, 51.9; H, 5.34; N, 8.25; $H_2O$, 7.06. Found: C, 52.18; H, 5.15; N, 8.29; $H_2O$ (loss on drying), 4.41.

The ultraviolet spectra of this compound compared to 6-deoxytetracycline, in 0.1 N HCl shows a shift in the short wavelength from 269 mμ to 262 mμ and in the long wavelength from 345 mμ to 360 mμ. The infrared spectra has nitro absorption bands at 6.55μ and 7.43μ. The product analyses about 1 part 7 - nitro - 6 - deoxytetracycline and 4 parts 9 - nitro - 6 - deoxytetracycline.

EXAMPLE 9

*Preparation of amino-6-deoxytetracycline*

A solution of 10 milligrams of the product of Example 8 in 5 milliliters of water was stirred, and an excess of zinc-copper couple was added. The pH was kept between 3 and 2 by the addition of 1.0 N hydrochloric acid. The mixture was stirred for 15 minutes, and the solution was filtered from excess zinc to give amino - 6 - deoxytetracycline $\lambda_{max.}^{0.1\ N\ HCl}$ 217, 263, 346 mμ

$\lambda_{max.}^{0.1\ N\ NaOH}$ 244, 277, 370 mμ

The product is a mixture of 7 - amino - 6 - deoxytetracycline and 9 - amino - 6 - deoxytetracycline.

EXAMPLE 10

*Preparation of 9-nitro-6-deoxytetracycline sulfate*

A solution of 6 - deoxytetracycline was prepared by slowly adding 1.00 gram (0.0021 mole) of 6 - deoxytetracycline hydrochloride to 40 milliliters of cold concentrated sulfuric acid. This solution was stirred and 216 milligrams (0.0021 mole) of potassium nitrate was added over a 5-minute period the reaction flask being kept in an ice bath. The solution was stirred 10 minutes and an additional 216 milligrams of potassium nitrate added as above. After stirring an additional 25 minutes, the solution was slowly poured onto 400 grams of ice with stirring. The resulting aqueous solution was extracted with n-butanol. The organic extract was washed with water and evaporated under vacuum until the formation of a precipitate. This sulfate salt was collected (0.75 gram). $R_f=0.56$ (n-butanol:pH 2 phosphate buffer).

EXAMPLE 11

*Preparation of 9-amino-6-deoxytetracycline disulfate*

A suspension of 645 milligrams of 9-nitro-6-deoxytetracycline sulfate in 65 milliliters of ethanol with 65 milligrams platinum dioxide and 3 drops of concentrated sulfuric acid was hydrogenated at room temperature and atmospheric pressure. The hydrogen uptake was 3 moles per mole of 9-nitro-6-deoxytetracycline. The solution was filtered from the catalyst and evaporated to a small volume. Excess ether was added and the precipitated 9-amino-6-deoxytetracycline disulfate salt collected (600 milligrams). $R_f=0.03$ (n-butanol:pH 2 phosphate buffer).

EXAMPLE 12

*Prepartion of 9-amino-7-bromo-6-deoxytetracycline disulfate*

To a solution of 100 milligrams of 9-amino-6-deoxytetracycline disulfate salt in 4.0 milliliters of concentrated sulfuric acid with stirring in an ice bath was added 32 milligrams of N-bromosuccinimide. The solution was stirred for 30 minutes and slowly poured into 100 milliliters of cold anhydrous ether with stirring. The resulting 9-amino-7-bromo-6-deoxytetracycline disulfate salt was collected and washed with cold, anhydrous ether (108 milligrams). $R_f=0.45$ (n-butanol:pH 2 phosphate buffer).

EXAMPLE 13

*Preparation of 9-amino-7-nitro-6-deoxytetracycline disulfate*

To a cold solution of 100 milligrams of 9-amino-6-deoxytetracycline disulfate salt in 4.0 milliliters of concentrated sulfuric acid was added 16 milligrams of potassium nitrate with stirring. The reaction flask was kept in an ice bath and the solution stirred for 5 minutes. After this time it was slowly added with stirring to 100 milliliters of cold anhydrous ether. The solid was collected and washed with ether and then dissolved in anhydrous methanol. This solution was filtered, evaporated to a small volume, and excess ether was added to precipitate the 9-amino-7-nitro-6-deoxytetracycline disulfate salt. This was collected and washed with ether (65 milligrams). $R_f=0.45$ (n-butanol:pH 2 phosphate buffer).

EXAMPLE 14

*Preparation of 7-bromo-9-nitro-6-demethyl-6-deoxytetracycline sulfate*

920 milligrams (2 m. moles) of 9-nitro-6-demethyl-6-deoxytetracycline was dissolved in 20 milliliters of concentrated $H_2SO_4$ at 0° C. To the cold stirred solution there was added 256 milligrams (2 mmoles) of N-bromosuccinimide. The reaction mixture was stirred at 0° C. for 30 minutes. The cold dark brown reaction mixture was poured into 1.1 liters of stirred ether (at 0° C.) at a rate which kept the temperature below 5° C. A fine light yellow solid precipitated which was filtered by suction and washed with ether (3×50 milliliters). The solid was dried under vacuum at room temperature for 2 hours. Weight 1.27 grams.

EXAMPLE 15

*Preparation of 11a-bromo-7-nitro-6-demethyl-6-deoxytetracycline sulfate*

130 milligrams (0.3 m. mole) of 7-nitro-6-demethyl-6-deoxytetracycline was dissolved in 3 milliliters of concentrated $H_2SO_4$ at 0° C. To the solution there was added 59.3 milligrams (0.3 m. mole) of N-bromosuccinimide. The solution was allowed to stir in the cold (0° C.) for 45 minutes. The cold dark brown reaction solution was poured into 150 milliliters of stirred ether at 0° C. at a rate which kept the temperature below 5° C. The light yellow solid which precipitated was filtered, washed with cold ether (3×5 milliliters) and dried under vacuum at 60° C. for one hour. Weight 170 milligrams.

EXAMPLE 16

*Preparation of 11a-bromo-7-amino-6-demethyl-6-deoxytetracycline disulfate*

92 milligrams of 7-amino-6-demethyl-6-deoxytetracycline was dissolved in 3 milliliters of concentrated $H_2SO_4$ at 0° C. To the dark brown solution there was added 37.5 milligrams of N-bromosuccinimide. The reaction mixture was stirred at 0° C. for one hour and then poured into 150 milliliters of stirred ether at 0° C. at a rate which kept the temperature below 5° C. The brownish-tan solid which precipitated was filtered, washed with cold ether, and dried under vacuum at room temperature for 3 hours. Weight 65 milligrams. $R_f=0.73$ (n-butanol:pH 2 phosphate buffer).

EXAMPLE 17

*Preparation of 7-bromo-9-nitro-6-deoxytetracycline sulfate*

A solution of 60.5 milligrams (0.1 m. mole) of 7-bromo-6-deoxytetracylcline sulfate (prepared by brominating 6-deoxytetracycline in concentrated sulfuric acid with one equivalent of N-bromosuccinimide) and 10.1 milligrams (0.1 m. mole) of potassium nitrate in 2.0 milliliters of concentrated sulfuric acid was stirred at ice-bath temperature for 10 minutes. The solution was slowly poured into 50.0 milliliters of cold ether depositing 45 milligrams of solid. $R_f=0.81$ (n-butanol:pH 2 phosphate buffer).

EXAMPLE 18

*Preparation of 7,11a-dibromo-6-deoxytetracycline sulfate*

A solution of 60.5 milligrams (0.1 m. mole) of 7-bromo-6-deoxytetracycline sulfate and 18 milligrams (0.1 m. mole) of N-bromosuccinimide in 2.0 milliliters of concentrated sulfuric acid was stirred at ice-bath temperature for 1 hour. The reaction solution was slowly poured into 200 milliliters of cold ether. The separated solid weighed 30 milligrams.

EXAMPLE 19

*Preparation of 7-bromo-9-nitro-6-deoxy-6-demethyltetracycline sulfate*

A solution of 59.1 milligrams (0.1 m. mole) of 7-bromo-6-deoxy-6-demethyltetracycline sulfate (prepared by brominating 6-deoxy-6-demethyltetracycline in concentrated sulfuric acid with one equivalent of N-bromosuccinimide) and 10.1 milligrams (0.1 m. mole) of potassium nitrate in 2.0 milliliters of concentrated sulfuric acir was stirred at ice-bath temperature for 10 minutes. The reaction mixture was slowly added to 100 milliliters of cold ether. The solid that separated weighed 54 milligrams.

EXAMPLE 20

*Preparation of 9-amino-7-bromo-6-deoxy-6-demethyltetracycline sulfate*

To a solution of 20 milligrams of 7-bromo-9-nitro-6-deoxy-6-demethyltetracycline sulfate in 3.0 milliliters of water was added an excess of Zn/Cu couple. The mixture was stirred at room temperature for fifteen minutes during which time the pH of the solution was maintained at 3 by adding 0.1 N sulfuric acid as necessary. The solution was filtered and the filtrate was freeze-dried. The residue was triturated with methanol and filtered. The filtrate was evaporated to dryness under reduced pressure yielding 6.0 milligrams of material. $R_f=0.21$ (n-butanol:pH 2 phosphate buffer).

EXAMPLE 21

*Preparation of 7-chloro-9-nitro-6-demethyl-6-deoxytetracycline base*

To a solution of 273 milligrams (0.5 m. mole) of 7-chloro-6-demethyl-6-deoxytetracycline sulfate in 20 milliliters of concentrated $H_2SO_4$ at 0° C. there was added 50 milligrams (0.5 m. mole) of solid potassium nitrate. After the addition of the potassium nitrate the solution, which had turned yellow, was stirred for 15 minutes at 0° C. and then poured into 150 grams of chopped ice. The resulting light yellow aqueous solution was filtered, to remove trace particles of impurity, and then extracted with n-butanol (6×15 ml.). The dark yellow butanol extracts were combined and concentrated to a volume of 15 milliliters. This thick solution was poured into 400 milliliters of stirred ether (at ice bath temperature). The light yellow solid which precipitated was filtered, washed with ether (3×10 ml.) and dried under vacuum at 60° C. for two hours. Weight 150 milligrams.

The above solid, 100 milligrams, was dissolved in 3 milliliters of $H_2O$. To this light brown solution (pH 1.5) there was added enough saturated solution of sodium carbonate to achieve a pH of 5.0. An orange-yellow solid precipitated immediately. The mixture was allowed to stir at room temperature for one half hour, filtered, washed with $H_2O$ (3×1 ml.) and dried in vacuo at 60° C. for three hours. Weight 62 milligrams.

*Analysis.*—Calculated for $C_{21}H_{20}N_3O_9Cl.1\frac{1}{2}H_2O$: C, 48.5; H, 4.45; N, 8.05; Cl, 6.81. Found: C, 48.40; H, 4.59; H, 8.20; Cl, 6.92.

EXAMPLE 22

*Preparation of 7-chloro-9-amino-6-demethyl-6-deoxytetracycline·$2H_2O_4$*

To 651 milligrams (1.1 m. moles) of 7-chloro-9-nitro-6-demethyl-6-deoxytetracycline in 100 milliliters of reagent methanol there was added 0.11 milliliter of concentrated $H_2SO_4$ and 65 milligrams of $PtO_2$. The mixture was shaken in a hydrogen atmosphere and the required amount of $H_2$ was absorbed within 10 minutes. The reaction was stopped at this point. The catalyst was removed by filtration and the clear red-brown filtrate was concentrated in vacuo to approximately 20 milliliters. This solution was gradually poured into 250 milliliters of stirred ether. The tan solid which precipitated immediately was stirred in the ether for 45 minutes and then filtered, washed with ether (3×10 ml.), and dried under vacuum at 60° C. for one hour. Weight 585 milligrams.

*Analysis.*—Calculated for $C_{21}H_{22}N_3O_7Cl.2H_2SO_4$: C, 38.21; H, 3.97; N, 6.37; Cl, 5.37; S, 9.72. Found: C, 39.00; H, 4.50; N, 6.04; Cl, 5.03; S, 9.34.

EXAMPLE 23

*Separation of nitro-6-deoxytetracycline into 7-nitro-6-deoxytetracycline and 9-nitro-6-deoxytetracycline*

The two isomeric nitro compounds prepared as in Example 8 were separated by chromatography using a Chromax Pressurized Paper Chromatography System.

The column was prepared by first saturating with 0.2 M phosphate buffer (pH=2.0) which had been equilibrated with n-butanol. It was then washed with the butanol layer until little to no aqueous layer was eluted. The flow rate was quite small (approximately 25 ml./hr.) and each of the operations required at least 24 hours. During this time and for the remainder of the run the external pressure on the column was maintained at 0.5 kg./cm.$^{-2}$.

One gram of the nitration mixture (product of Example 8) was dissolved in 10 milliliters of the butanol saturated aqueous buffer and applied to the top of the column. As soon as the liquid was absorbed by the column, the elution with the butanol layer was begun. Fractions were collected over 30-minute periods.

Runs similar to the one described above were performed in which the external pressure was varied, the amount of charge was less, and the application solvent was methanol. In all cases essentially the same results were obtained.

*Isolation of 7-nitro-6-deoxytetracycline sulfate.*—The cuts which contained 7-nitro-6-deoxytetracycline (usually about five) were combined, washed with 3.6 N sulfuric acid (10 ml.) and with water (2×5 ml.), and concentrated under vacuum to a small volume. Crystals began to form and were collected after overnight refrigeration.

After drying the yield of product was usually 50 milligrams.

This solid material (approximately 250 milligrams) from several runs was combined and dissolved in 25 milliliters of water containing 3 drops of concentrated sulfuric acid. This was extracted with 100 milliliters of n-butanol and the butanol layer was washed with 10 milliliters of water. Concentration of the butanol layer under vacuum yielded 210 milligrams of solid after overnight refrigeration. This was vacuum dried and analysed well for the sulfate with a butanol of crystallization.

*Aanalysis.*—Calculated for $C_{22}H_{23}N_3O_9 \cdot H_2SO_4 \cdot BuOH$: C, 48.37; H, 5.46; N, 6.51; S, 4.96. Found: C, 48.20; H, 5.43; N, 6.66; S, 4.77.

*Isolation of 9-nitro-6-deoxytetracycline sulfate.* — A similar procedure was used for this isomer with corresponding larger amounts of solvents. The analytical sample was prepared in the same manner.

*Analysis.*—Calculated for $C_{22}H_{23}N_3O_9 \cdot H_2SO_4 \cdot BuOH$: C, 48.37; H, 5.46; N, 6.51; S, 9.96. Found: C, 48.20; H, 5.20; N, 6.72; S, 4.87.

EXAMPLE 24

*Preparation of 9-amino-7-nitro-6-demethyl-6-deoxytetracycline sulfate*

To a cold solution of 466 milligrams of 9-amino-6-demethyl-6-deoxytetracycline hydrochloride in 20 milliliters of concentrated sulfuric acid was added 0.70 milliliter of a 10% (by volume) solution of concentrated nitric acid in sulfuric acid. After stirring for 5 minutes the reaction solution was poured into 1 pound of cold anhydrous ether. The resulting precipiate was collected, washed with ether and vacuum dried. It was dissolved in 25 milliliters of methanol, 25 milliliters of ethanol was added, and after filtering the product was precipitated by addition of ether.

$\lambda_{max.}^{0.1\ N\ HCl}$ 262 (log $E$=4.29), 348 (log $E$ 2 4.20)

$R_f$=0.20 in n-butanol:phosphate buffer (pH=2.0).

*Analysis.*—Calculated for $C_{21}H_{22}N_4O_9 \cdot 1\frac{3}{4}H_2SO_4$: C, 39.04; H, 3.98; N, 8.68; S, 8.68. Found: C, 39.0; H, 4.8; N, 8.3; S, 8.7.

EXAMPLE 25

*Preparation of 7-formamido-6-demethyl-6-deoxytetracycline*

A solution of 4.5 grams (9 m. moles) of 7-amino-6-demethyl-6-deoxytetracycline.2HCl in 20 milliliters of 98% formic acid was heated at reflux for 1.5 hours. The dark brown solution was cooled to room temperature and then gradually poured into 500 milliliters of stirred cold ether (ice-bath temperature). A yellow solid precipitated immediately. The mixture was stirred at ice-bath temperature for one hour and then the solid was filtered, washed with ether (50 milliliters) and dried in vacuo at 60° C. for two hours. Weight 4.52 grams.

500 milligrams of the above solid was dissolved in 5 milliliters of reagent methanol. To this dark brown solution (pH 1.8) there was added enough triethylamine to obtain a pH 6.0. A thick mass of dark yellow solid which precipitated from solution was stirred at room temperature for 15 minutes. The solid was filtered, washed with ether (4×10 ml.) and dried under vacuum at 60° C. for one hour. Weight 265 milligrams.

*Analysis.*—Calculated for $C_{22}H_{23}N_3O_8 \cdot 2H_2O$: C, 53.53; H, 5.52; N, 8.52. Found: C, 53.74; H, 6.35; N, 8.52.

EXAMPLE 26

*Preparation of 9-formamido-6-demethyl-6-deoxytetracycline*

A solution of 4.19 grams (9 m. moles) of 9-amino-6-demethyl-6-deoxytetracycline.HCl in 20 milliliters of 98% formic acid was heated at reflux for 1.5 hours. The reaction solution was gradually poured into 500 milliliters of cold stirred ether (ice-bath temperature). A light yellow solid precipitated immediately. After stirring this mixture for 15 minutes, the solid was filtered, washed with ether (4×25 ml.) and dried under vacuum at 60° C. for two hours. Weight 4.74 grams.

200 milligrams of the above solid was dissolved in 2 milliliters of reagent methanol. This dark brown solution (pH 3.3) was adjusted to pH 6.6 with triethylamine. The light yellow solid which precipitated was stirred at room temperature for 15 minutes and then filtered, washed with one milliliter of methanol and then dried in vacuo at 60° C. for two hours. Weight 100 milligrams.

*Analysis.*—Calculated for $C_{22}H_{23}N_3O_8 \cdot H_2O$: C, 55.57; H, 5.31; N, 8.84. Found: C, 55.08; H, 5.55; N, 9.03.

EXAMPLE 27

*Preparation of 9-p-nitrobenzenesulfonamido-6-deoxytetracycline*

To a solution of 1.28 grams of 9-amino-6-deoxytetracycline disulfate in 40 milliliters of water was added 666 milligrams of p-nitro-benzenesulfonyl chloride. The mixture was stirred while a solution of 1.00 gram of sodium acetate was added over a 15-minute period. After stirring an additional 2 hours the resulting product was collected, washed with water and then with ether, and vacuum dried to yield 1.11 grams of product.

EXAMPLE 28

*Preparation of 7-p-nitrobenzenesulfonamido-6-deoxytetracycline*

The procedure of Example 27 was used to prepare the 7-isomer starting with 7-amino-6-deoxytetracycline disulfate.

To a solution of 640 milligrams of 7-amino-6-deoxytetracycline disulfate in 20 milliliters of water was added 330 milligrams of p-nitrobenzenesulfonyl chloride with stirring. A solution of 500 milligrams of sodium acetate in 5 milliliters of water was added and the mixture was stirred for two hours. After overnight refrigeration, the solid was collected, washed with water and ether and dried. Yield, 620 milligrams.

EXAMPLE 29

*Preparation of 9-p-aminobenzenesulfonamido-6-deoxytetracycline*

To a solution of 1.00 gram of 9-p-nitrobenzenesulfonamido-6-deoxytetracycline in 100 milliliters of ethanol containing 0.4 milliliter of concentrated sulfuric acid was added 100 milligrams of platinum dioxide. This mixture was stirred in a hydrogen atmosphere at room temperature and atmospheric pressure until the uptake of hydrogen stopped. The solution was filtered from the catalyst and concentrated under vacuum to a small volume. Excess ether was added and the resulting solid was collected, washed with ether, and vacuum dried to yield 1.10 grams of product.

EXAMPLE 30

*Preparation of 9-acetamido-6-deoxytetracycline*

A solution of 5.0 grams of sodium acetate in 25 milliliters of water was added to a solution of 6.4 grams 9-amino-6-deoxytetracycline disulfate in 350 milliliters of water. With stirring 2.0 milliliters of acetic anhydride was added to the above solution at room temperature and the stirring was continued for 10 minutes at which time 1.0 milliliter of concentrated ammonium hydroxide was added. After stirring for 5 more minutes 5.0 milliliters of concentrated sulfuric acid was added.

The above aqueous solution was extracted with n-butanol (2×375 ml. and 1×200 ml.) and the combined butanol extract was washed with water (2×25 ml.). The butanol layer was then concentrated under vacuum to approximately 170 milliliters and the resulting solid was collected after overnight refrigeration. It was washed with n-butanol and chloroform, and vacuum dried to yield 2.9 grams of product.

EXAMPLE 31

*Preparation of 7-acetamido-6-deoxytetracycline*

The procedure of Example 30 was used to prepare the 7-isomer starting with 7-amino-6-deoxytetracycline disulfate.

EXAMPLE 32

*Preparation of 7,9-diacetamido-6-deoxytetracycline*

To a solution of 25 milligrams of 7,9-diamino-6-deoxytetracycline trisulfate in 5 milliliters of water was added 25 milligrams of sodium acetate followed by 0.1 milliliter of acetic anhydride with stirring. After 10 minutes 0.05 milliliter of concentrated ammonium hydroxide was added and after 5 minutes 0.25 milliliter of concentrated sulfuric acid was added.

This aqueous solution was evaporated to dryness and the residue extracted with n-butanol and then methanol. The combined liquids were evaporated to a small volume and filtered from the resulting precipitate. Excess ether was added to the filtrate and the resulting solid was collected, washed with ether and vacuum dried to yield 22 milligrams of product.

EXAMPLE 33

*Preparation of 7-bromo-9-acetamido-6-deoxytetracycline*

To a solution of 100 milligrams of 9-acetamido-6-deoxytetracycline in 4.0 milliliters of cold concentrated sulfuric acid was added 35 milligrams of N-bromosuccinimide. The reaction solution was stirred for 15 minutes in an ice bath and then slowly poured into 100 milliliters of cold anhydrous ether. The resulting solid was collected and washed with anhydrous ether. It was redissolved in methanol and precipitated with excess anhydrous ether to yield 30 milligrams of product.

EXAMPLE 34

*Preparation of 7-nitro-9-acetamido-6-deoxytetracycline*

To a solution of 584 milligrams of 9-acetamido-6-deoxytetracycline sulfate in 23 milliliters of cold concentrated sulfuric acid was added 101 milligrams of potassium nitrate. After stirring for 5 minutes the reaction solution was poured slowly into one pound of cold anhydrous ether. The resulting solid was collected, washed with ether, and vacuum dried to yield 600 milligrams of product.

The same material was obtained by acetylation of 7-nitro-9-amino-6-deoxytetracycline in aqueous solution with acetic anhydride.

EXAMPLE 35

*Preparation of N-[9(6-deoxy-6-demethyltetracycline]-p-carboxamido-phenylboronic acid*

Finely powdered p-carboxyphenylboronic acid (1.00 g.) was suspended in oxalyl chloride (25 ml.), dry dimethylformamide (0.20 ml.) was slowly added dropwise with stirring, and the suspension was then allowed to stir at room temperature for 16 hours under anhydrous conditions. Evaporation of solvent in vacuum, followed by addition of 30 milliliters of dry benzene and a second evaporation in vacuo, gave the intermediate p-chlorocarbonyl phenylboronic acid.

To the above intermediate were added 9-amino-6-deoxy-6-demethyltetracycline hydrochloride (0.55 g.) and sodium carbonate (0.98 g.). To the flask was added cold water (35 ml.) with rapid stirring. Stirring was maintained for one hour at room temperature and the entire reaction mixture was then freeze-dried. The resulting powder was triturated with methanol (100 ml.) containing acetic acid (3 ml.) for 30 minutes at 10° C. to give the crude amide. Further purification was achieved by stirring the amide in 30 volumes of 90% methanol for 60 minutes at room temperature and isolation of the insoluble p-carboxamido-phenylboronic acid derivative by filtration.

$C_{28}H_{28}O_{10}N_3B \cdot (H_2O)$ requires B, 1.82%.
Found: B—1.65%, 1.68%.

EXAMPLE 36

*Preparation of 6-demethyl-6-deoxytetracycline-9-diazonium hydrochloride*

To a solution of 1.0 gram (0.002 mole) of 9-amino-6-demethyl-6-deoxytetracycline hydrochloride in 23 milliliters of 0.1 N methanolic HCl, cooled to 0–5°, was added 1.0 milliliter (0.009 mole) of n-butyl nitrite. The solution was stirred at this temperature for fifteen minutes and then poured into 1500 milliliters of cold ether. The solid which separated was filtered, washed with ether, and dried; yield, 0.98 gram.

EXAMPLE 37

*Preparation of 7,9-dinitro-6-demethyl-6-deoxytetracycline*

Powdered potassium nitrate (0.89 g., 0.009 mole) was added with stirring to 5.00 grams (0.009 mole) of 7-nitro-6-demethyl-6-deoxytetracycline hydrochloride in 100 milliliters of concentrated sulfuric acid. The solution was stirred for forty-five minutes and then added dropwise with stirring to two liters of cold anhydrous ether. The solid was filtered and added to one liter of anhydrous ether, stirred for one half hour, filtered and dried.

The product was stirred in 1.7 liters of water and after the insoluble material was removed by filtration, the filtrate was neutralized to a pH of 4.5 with 10% sodium hydroxide. The yellow precipitate was filtered, washed well with water and dried.

EXAMPLE 38

*Preparation of 7,9-diamino-6-demethyl-6-deoxytetracycline*

A solution of 70 milligrams (0.116 mmole) of 7,9-dinitro-6-demethyl-6-deoxytetracycline sulfate was dissolved in a solution of 3 milliliters of glacial acetic acid and one milliliter of water. To the solution was added 15 milligrams of $PtO_2$ and the resulting mixture was reduced in a Parr hydrogenator at room temperature. The catalyst was filtered and the filtrate freeze-dried leaving 44 milligrams of product.

EXAMPLE 39

*Preparation of 6-deoxytetracycline-9-diazonium disulfate*

3.57 milliliters of n-butyl nitrite were added to a solution of 5.00 grams (0.0078 mole) of 9-amino-6-deoxytetracycline in 0.1 N methanolic HCl at 5–10°. The solution was stirred for 40 minutes at this temperature and then poured into one liter of cold anhydrous ether. The resulting solid was filtered, washed with ether and dried.

EXAMPLE 40

*Preparation of 6-demethyl-6-deoxytetracycline-7-diazonium sulfate hydrochloride*

To a cold solution of 100 milligrams (0.19 mmole) of 7-amino-6-demethyl-6-deoxytetracycline sulfate in 1 milliliter of methanolic hydrogen chloride at ice-bath temperature was added 0.1 milliliter of n-butyl nitrite. The reactive mixture was stirred at this temperature for 30 minutes and slowly poured into 100 milliliters of ether. The solid that separated weighed 95 milligrams.

EXAMPLE 41

*Preparation of 9-nitro-5-hydroxy-6-deoxytetracycline hydrochloride*

One gram of 5-hydroxy-6-deoxytetracycline hydrochloride was added with stirring to forty milliliters of concentrated sulfuric acid at ice-bath temperature. Two hundred and ten milligrams of potassium nitrate were added and after stirring three minutes, the reaction solution was poured into four hundred grams of crushed ice.

The resulting solution was extracted with n-butanol, the extracts combined, washed with water and concentrated. The butanol concentrate was added to anyhydrous ether and the resulting solid collected and washed with ether and dried; yield, 600 milligrams.

EXAMPLE 42

*Preparation of 9-amino-5-hydroxy-6-deoxytetracycline sulfate*

Platinum oxide (11 mgs.) and two drops of concentrated sulfuric acid were added to one hundred and eleven milligrams of the nitration product of 5-hydroxy-6-deoxytetracycline sulfate which was slurried in eleven milliliters of absolute ethanol.

The solution was hydrogenated in a Parr apparatus at room temperature and atmospheric pressure, filtered and concentrated under reduced pressure. The precipitate which resulted from the addition of ether to the solution was collected, washed with ether and dried; yield, 108 milligrams.

We claim:

1. A compound of the group consisting of tetracyclines of the formula:

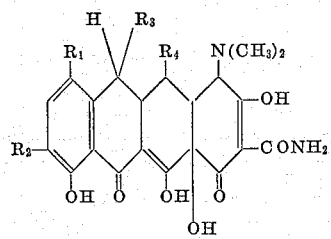

wherein $R_1$ and $R_2$ are members of the group consisting of hydrogen, nitro, amino, formylamino, acetylamino, p-dihydroxyborylbenzoylamino, p-aminobenzenesulfonylamino, chlorine, bromine and diazonium excepting that $R_1$ and $R_2$ may not both be hydrogen and when $R_1$ is a member of the group consisting of chlorine and bromine $R_2$ may not be hydrogen and vice versa, $R_3$ is a member of the group consisting of hydrogen and methyl and $R_4$ is a member of the group consisting of hydrogen and hydroxy, and the non-toxic acid addition salts thereof.

2. 7-nitro-6-demethyl-6-deoxytetracycline.
3. 9-nitro-6-demethyl-6-deoxytetracycline.
4. 7-nitro-6-deoxytetracycline.
5. 9-nitro-6-deoxytetracycline.
6. 7-amino-6-demethyl-6-deoxytetracycline.
7. 9-amino-6-demethyl-6-deoxytetracycline.
8. 7-amino-6-deoxytetracycline.
9. 9-amino-6-deoxytetracycline.
10. 9-amino-7-nitro-6-deoxytetracycline.
11. 9-amino-6-deoxy-5-hydroxytetracycline.
12. A compound selected from the group consisting of

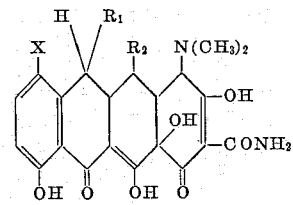

and

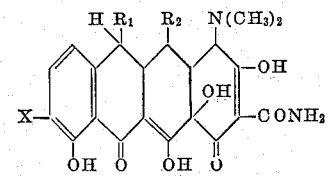

wherein X is a member selected from the group consisting of nitro and amino; $R_1$ is a member selected from the group consisting of hydrogen and methyl; $R_2$ is a member selected from the group consisting of hydrogen and hydroxyl; with the provision that $R_1$ is methyl when $R_2$ is hydroxyl; and the non-toxic acid addition salts thereof.

No references cited.

NICHOLAS S. RIZZO, *Primary Examiner.*

IRVING MARCUS, *Examiner.*

J. W. ADAMS, *Assistant Examiner.*